United States Patent Office 2,744,106
Patented May 1, 1956

2,744,106

NEW ALKALOID FROM VERATRUM ALBUM AND A METHOD FOR ITS RECOVERY

Robert M. Brooker and Harold A. Nash, Indianapolis, Ind., assignors to Allied Laboratories, Inc., Kansas City, Mo., a corporation of Delaware No Drawing. Application November 7, 1952, Serial No. 319,432

3 Claims. (Cl. 260—236)

This invention relates to a physiologically active alkaloid and to processes for its production. More particularly, it relates to the recovery and/or purification of a new alkaloid from *Veratrum album*.

*Veratrum album* has long been known to contain alkaloids that are effective in lowering blood pressure. In spite of this property, alkaloidal preparations from *Veratrum album* have been used to treat high blood pressure only sporadically during the last 70 years. One reason for their sporadic use has been that the range between the dose causing blood pressure fall and the dose causing undesirable side effects, such as vomiting, is a narrow one. Striking this narrow range with the complex mixture of alkaloids as isolated from the plant is very difficult, and this is especially true when it is considered that *Veratrum album* roots from various sources and during various seasons of the year vary in their alkaloidal content and proportions of alkaloids. Biological assays conducted on each lot of alkaloids have permitted more accurate dosing, but the results obtained are still quite variable.

Attempts have been made in the past to isolate pure individual alkaloids from *Veratrum album* with the hope that one having a high hypotensive action and uniformity of composition could be found. The procedures described by Craig and Jacobs [J. Biol. Chem., 143, 427 (1942); J. Biol. Chem., 149, 271 (1943)] are the ones most frequently referred to in connection with processes for isolating alkaloids from *Veratrum album*. The Craig and Jacobs' procedures separate the *Veratrum album* alkaloids into two board classes, namely, those that have a low ether solubility and characterized by being crystallizable from chloroform-ether mixtures, and those that are soluble in ether and have been generally characterized as amorphous substances. In their process, the ground roots of *Veratrum album* are extracted with benzene made alkaline with ammonium hydroxide. The benzene solution of the alkaloids is then extracted with aqueous acetic acid. The acid extract is made alkaline and extracted with benzene. This benzene solution is evaporated to dryness, and the alkaloidal residue extracted with dry ether. The residue remaining after the ether extraction step constitutes crude protoveratrine together with certain other low ether-soluble alkaloids. The ether-soluble amorphous alkaloids are obtained by evaporating the ether solution to dryness.

In accordance with our invention, we have discovered that the ether-soluble amorphous alkaloids recovered by the Craig and Jacobs' process can be processed and a new crystalline alkaloid having hypotensive activity recovered therefrom. In carrying out our invention, the ether-soluble fractions of amorphous alkaloids obtained in the Craig and Jacobs' process are subjected to a countercurrent distribution treatment which results in the isolation of a new crystalline alkaloidal substance which we designate as germitetrine B.

Germitetrine B is represented by the following partial empirical formula indicating the ester groups.

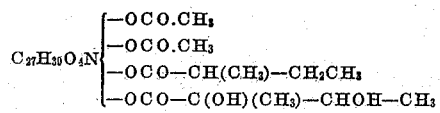

There are many ways of carrying out countercurrent distribution processes, and our invention is not limited to any particular technique. In order to illustrate the invention, the following is a description of a countercurrent distribution treatment using separatory funnels.

A quantity of ground roots and rhizomes of *Veratrum album* were extracted according to the procedure of Craig and Jacobs. After removal of the protoveratrine fraction and drying of the ether-soluble fraction, an amorphous residue remained. This was taken up in ether, extracted with 5% acetic acid solution, the acetic acid neutralized with ammonium hydroxide and extracted from the water phase with chloroform. The chloroform extracts were combined and evaporated to dryness. This residue was partially separated by a technique known as countercurrent distribution using separatory funnels.

Methylene chloride (8910 ml.), 8910 ml. of water, and 180 ml. of glacial acetic acid were mixed intimately and the phases allowed to separate. Each phase was used in the procedure that follows. The dried amorphous residue (180 gm.) was introduced into a separatory funnel containing 450 ml. of each liquid phase described above. After shaking to effect equilibrium, the methylene chloride phase was moved to a second funnel containing 450 ml. of the water phase. Fresh methylene chloride (450 ml.) was moved into funnel No. 1. After shaking to equilibrate, the methylene chloride phase from funnel No. 2 was moved into funnel No. 3 (containing 450 ml. of the water phase); the methylene chloride phase from funnel No. 1 was moved into funnel No. 2, and fresh methylene chloride was moved into funnel No. 1. This process was repeated until the methylene chloride reached funnel No. 20. At this point, examination showed that the desired alkaloid was in funnels 12 through 17 with several other alkaloids. The alkaloid was recovered by drawing off and pooling the methylene chloride phases from funnels 12 through 17 and then making the water phases in these funnels alkaline with ammonia and repeatedly extracting with small portions of methylene chloride, the methylene chloride being added to the previously pooled methylene chloride and the entire methylene chloride concentrated and finally dried in vacuo to leave 42.6 g. of solid. n-Butyl chloride (225 ml.) was added to the solid and heated to form a clear solution. While the solution was still warm, 60 ml. of petroleum ether (B. P. 30–60° C.) was slowly added and the mixture allowed to stand. A flocculent precipitate was filtered out, the solution warmed, and 150 ml. more of petroleum ether slowly added. The mixture was allowed to cool slowly to room temperature and then cooled to 5° C. After standing for about 24 hours, the alkaloid (5.0 g.) was removed by filtration.

The alkaloid recovered from funnels 12 through 17 by this method has been named germitetrine B. The said germitetrine B thus obtained being substantially free from other ether-soluble alkaloids of *Veratrum album*. It has been found on hydrolysis to yield one mole each of germine, 2-methylbutyric acid and 2,3-dihydroxy-2-methylbutyric acid and two moles of acetic acid per mole of germitetrine B. It melts at 233–234° C. has $(\alpha)_D{}^{25}$ of $-68.0°$ ($c=1$ in pyridine) and $-17.2°$ ($c=1$ in chloroform).

In carrying out our countercurrent distribution method for recovery of this new alkaloid, germitetrine B, the particular solvent systems may be replaced by other solvent substances. Among those that are satisfactory may be included ethylene chloride, chloroform, methyl chloroform, and similar chlorinated solvents. Likewise, various acids or buffering substances can be used to acidify the aqueous phase, and the pH values of the aqueous phase may be varied somewhat depending upon the organic solvent being employed.

We claim:

1. The process of separating a crystalline alkaloid from the ether-soluble amorphous residue obtained from *Veratrum album* by extracting ground roots of *Veratrum album* with benzene made alkaline with ammonium hydroxide, extracting the benzene solution with aqueous acetic acid, making the acid extract alkaline and extracting with benzene, evaporating the benzene extract to dryness, extracting the residue with ether and evaporating the ether extract to dryness which comprises subjecting said ether-soluble amorphous residue to a countercurrent distribution treatment employing an acidified aqueous-chlorinated solvent system to effect recovery of an alkaloid, germitetrine B represented by the following partial empirical formula indicating the ester groups,

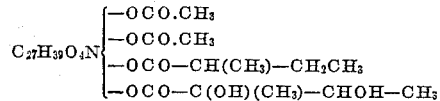

having a melting point of about 233–234° C. and $(\alpha)_D^{25}$ of $-68.0°$ in pyridine and $-17.2°$ in chloroform, and which on hydrolysis yields one mole each of germine, 2-methylbutyric acid, and 2,3-dihydroxy-2-methylbutyric acid and two moles of acetic acid per mole of germitetrine B.

2. The process of claim 1 wherein the countercurrent distribution treatment utilizes a solvent system comprising acidified water and a chlorinated solvent of the group consisting of ethylene chloride, methyl chloroform, methylene chloride, and chloroform.

3. The process of claim 1 wherein the countercurrent distribution treatment utilizes a solvent system comprising water acidified with acetic acid and methylene chloride.

References Cited in the file of this patent

Glen et al.; Nature, vol. 170, page 932 (November 1952).

Poethke; Archive Pharm. 275, 577 (1937).